Patented Dec. 13, 1938

2,139,697

UNITED STATES PATENT OFFICE 2,139,697

THIOUREA DERIVATIVES

Paul Lawrence Salzberg, Wilmington, Del., assignor to E. I. du Pont de Nemours & Company, Wilmington, Del., a corporation of Delaware No Drawing. Application July 9, 1937, Serial No. 152,753

14 Claims. (Cl. 260—513)

This invention relates to new chemical compounds, their methods of preparation, and their uses, and more particularly to the production and various technical applications of new surface active thioureas.

This invention has as an object the preparation of new surface active compounds. A further object is to prepare these compounds by novel and easily conducted methods which give high yields of products of excellent quality. A still further object is to use these new products in a variety of connections wherein surface active products are commonly employed. Other objects will appear hereinafter.

The objects of the invention are accomplished in one way by reacting an acyclic isothiocyanate, R—NCS, wherein R has preferably at least eight carbon atoms, with an amine having at least one amino hydrogen atom and in which another amino hydrogen atom is replaced by a radical containing a water-solubilizing polar group. The objects of the invention are accomplished in another way by reacting the long chain alkyl isothiocyanate with the amine and subsequently introducing the water-solubilizing polar group into the product, as by sulfating or sulfonating the same. In either case, the final products are compounds in which the n-long chain alkyl thiourea structure is joined with hydrophilic radicals imparting a surface-active effect, that is, they are nitrogen-substituted thioureas in which one of the substituents is an open chain aliphatic group having at least eight carbon atoms and another of the substituents is a radical which contains a water-solubilizing polar group, such as a sulfate, sulfonate, carboxyl, amino, or hydroxyl group.

The following examples, in which parts given are by weight, illustrate but do not limit the invention.

Example 1

*n - Dodecyl - n' - (p - sulfophenyl) thiourea.*—A mixture of 11.5 parts of n-dodecyl isothiocyanate, 10.0 parts of sodium sulfanilate, 50 parts of water, and 150 parts of ethyl alcohol was heated under a reflux for 7 hours. On cooling, a white solid separated which was filtered and dried, the yield being 80% of theory, based on the dodecyl isothiocyanate. This substance is somewhat soluble in water, and the solution is surface active. A sulfur content of 14.64% (calculated amount 14.76%) indicated that the probable formula of this new compound in the form of a free acid is:

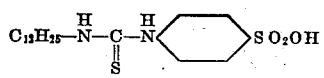

In this compound, the hydrophylic or water-solubilizing polar group is the —SO₂OH radical, which radical was derived from the original amine.

Example 2

*n-Octyl-n'-(p-sulfophenyl) thiourea.*—A mixture of 8.6 parts of n-octyl isothiocyanate, 9.8 parts of sodium sulfanilate, 100 parts of ethyl alcohol, and 50 parts of water was heated under a reflux for eight hours. The solution was evaporated on a steam bath, and the solid which separated was crystallized from a mixture of methyl alcohol and water. The yield was 90%. This material is somewhat soluble in water, and the solution is surface active. The probable formula of this new compound in the form of a free acid is:

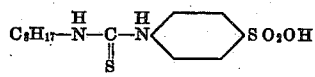

This compound is of the same type as that of Example 1, the solubilizing group being the same. It contains a different long chain alkyl radical.

Example 3

*n-Dodecyl - n' - (sulfophenetyl) thiourea.*—On the addition of 50.2 parts of n-dodecyl isothiocyanate to 41.2 parts of phenetidine (p-ethoxyaniline), an exothermic reaction occurred. After this initial reaction was complete, the mixture was heated on a steam bath for one hour. The resulting n-dodecyl-n'-phenetyl thiourea was recrystallized four times from low-boiling gasoline after which it had a melting point of 87–88° C. and a sulfur content of 8.64% (calculated value 8.79%). On sulfonation of this material, a water-soluble surface-active compound was obtained. The probable formula of this new compound is:

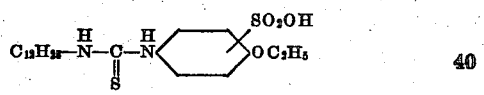

The exact location of the sulfonate group on the benzene ring is not at this time definitely known. This compound is of the same general type as the compound of Examples 1 and 2 but has a somewhat more complex structure.

Example 4

*n - Dodecyl - n' - (beta-sulfoethyl) thiourea.*—2 parts of taurine (NH₂—CH₂—CH₂—SO₂OH) was dissolved in water and 0.65 part of sodium hydroxide was added. To this clear solution was added 3.8 parts of n-dodecyl isothiocyanate dissolved in ethyl alcohol, and the reaction mixture heated under a reflux for 6 hours. The reaction mixture was evaporated to dryness and extracted with warm water. The oil was filtered off, and the water solution evaporated to dryness. A light yellow solid was obtained which was soluble in water and showed high efficiency as a detergent. The probable formula of this new compound in the form of a free acid is:

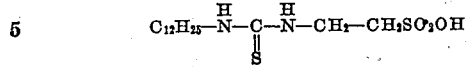

As in the case of the preceding examples, the solubilizing group in the above compound is also the SO₂OH group; it is, however, separated from the amido nitrogen by an aliphatic rather than an aromatic radical.

Example 5

*n-(9,10-Octadecenyl)-n'-(beta-sulfoethyl) thiourea.*—9.5 parts of 9,10-octadecenyl isothiocyanate and 4.5 parts of the sodium salt of taurine were dissolved in a mixture of 20 parts of water and 40 parts of ethyl alcohol, and the mixture heated under a reflux for about 6 hours. On cooling, filtering, and evaporating the filtrate to dryness, there was obtained altogether 14 parts of a white solid which was soluble in water to give a surface active effect. This material was tested as a detergent and was found to have excellent properties in both hard and soft water. A sulfur content of 13.55% (calculated value 14.00%) indicated that the probable formula of this new compound in the form of a free acid is:

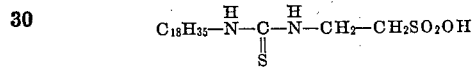

This compound is similar to that of Example 4 except that the long chain alkyl radical is unsaturated instead of saturated.

Example 6

*n-Dodecyl-n'-sulfatopropyl thiourea.*—37 parts of n-dodecylamine was added slowly to 20.0 parts of allyl isothiocyanate. After the initial exothermic reaction had subsided, the mixture was finally heated for 30 minutes on a steam bath. After cooling, petroleum ether was added, and the crystals filtered. The yield was 57 parts, M. P. 48–50° C. This material on sulfation with acetyl sulfuric acid yielded a product whose alkali metal salts were soluble in water and were surface active. The probable formula of this new compound in the form of a free acid is:

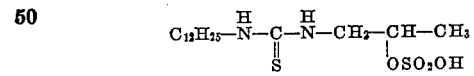

In the above compound, the solubilizing group is the -OSO₂OH group rather than the -SO₂OH radical.

Example 7

*n-Dodecyl-n'-methyl-n'-sorbityl thiourea.*—11.5 parts of dodecyl isothiocyanate was dissolved in 100 parts of ethyl alcohol and added to a solution of 9.3 parts of methylglucamine in 50 parts of water. The solution was heated under a reflux for one-half hour. The mixture was then evaporated to dryness, the residue dissolved in hot benzene, treated with boneblack, and filtered. The benzene solution set to a jelly and could not be filtered from the solid, thus necessitating removal of the benzene by evaporation. The yield of pure white solid was 90%, based on the dodecyl isothiocyanate. This material did not possess a definite melting point. It first became jelly-like, and, as the temperature was raised, gradually became clear. The compound was somewhat soluble in water, and the solution was surface active. As indicated by a sulfur content of 7.66% (calculated amount 7.60%), the probable formula of this new compound is:

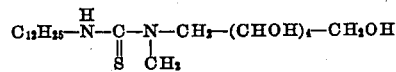

In the above compound, the solubilizing group contains hydroxyl radicals which represent the other extreme of polarity from sulfonate groups.

Products similar to those disclosed in Examples 1 and 2 may be prepared by using decyl, undecyl, tetradecyl, cetyl, octadecyl, 9,10-octadecenyl, pentadecyl-8, 3,9-diethyltridecyl-6, or eicosyl isothiocyanate in place of octyl or dodecyl isothiocyanate. Any desired mixture of the aforesaid isothiocyanates may be employed for preparing these new thioureas. For instance, a mixture of the isothiocyanates prepared from the mixture of amines obtained from the nitriles of coconut oil acids may be used in this connection.

Products similar to that disclosed in Example 3 may be made by substituting any of the higher alkyl isothiocyanates mentioned in the preceding paragraph for dodecyl isothiocyanate in the reaction disclosed in this example. Similar surface active thioureas may be obtained according to this example by substituting aniline, toluidine, aminophenol, or anisidine for phenetidine.

Products similar to those disclosed in Examples 4 and 5 may be made by using octyl, decyl, tetradecyl, cetyl, or octadecyl isothiocyanate in place of dodecyl or 9,10-octadecenyl isothiocyanate. Obviously, any desired mixture of the aforesaid isothiocyanates may be employed in place of any individual higher alkyl isothiocyanate in this reaction. Methyltaurine may be used in place of taurine to prepare products similar to those disclosed in these examples. The sodium salt of n-octadecyl-n'-methyl-n'-sulfoethyl thiourea and the sodium salt of n-(9,10-octadecenyl)-n'-methyl-n'-sulfoethyl thiourea may be prepared from methyltaurine and octadecyl and 9,10-octadecenyl isothiocyanatees respectively by processes similar to those disclosed in Examples 4 and 5.

In place of dodecyl amine, which is disclosed in Example 6, there may be used octyl, decyl, tetradecyl, cetyl, or octadecyl amines or any desired mixture of the aforesaid amines for preparing products similar to the one disclosed in Example 6.

In preparing new surface active thioureas according to the process set forth in Example 7, use may be made of octyl, decyl, tetradecyl, cetyl, or octadecyl isothiocyanate in place of dodecyl isothiocyanate. In place of methylglucamine, use may be made of glucamine, xylamine, methylxylamine, butylxylamine, ethylglucamine, hydroxy-ethylglucamine, methylgalactamine, methylfructamine or any other primary or secondary "sugar" amine derived from a pentose or a hexose. The aforesaid "sugar" amines may conveniently be obtained from sugars by the processes described by Flint and Salzberg in U. S. Patent No. 2,016,962. Monoethanolamine, diethanolamine, or aminopropanediol may also be used in place of any of these "sugar" amines. If it is desired to enhance the water-solubility of thioureas prepared from these hydroxylated amines, this may be done by esterifying the hydroxyl groups in these thioureas with sulfuric, phosphoric, or boric acids, or the anhydrides or chlorides of the aforesaid acids. The water-solubility of thioureas prepared from these hydroxylated amines may also be modified by reacting said thioureas with ethylene oxide.

New thioureas also coming within the scope of this invention may be made by reacting a higher alkyl isothiocyanate with substantially equimolecular amounts of a diamine such as ethylenediamine, propylenediamine, phenylenediamine, etc. The water-solubility of the new thioureas prepared in this way may be modified by reacting ethylene oxide with the free amino group in said thiourea.

It may be seen from the foregoing description that this invention relates generically and preferentially to new surface active thioureas having the general formula:

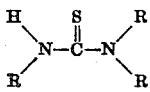

in which one of the R's is an acyclic hydrocarbon radical having at least 8 carbon atoms (preferably in a straight chain), another R is an organic residue having a water-solubilizing polar group (preferably a radical AZ wherein A is hydrocarbon and Z is the polar group), and the remaining R is hydrogen or a hydrocarbon radical. The water-solubilizing polar group may be a sulfonate, sulfate, phosphate, borate, hydroxyl, amino, or polyethenoxy group. In general, a water-solubilizing polar group may be regarded as a radical derived from a polar liquid such as those mentioned on page 220 of Eucken's "Fundamentals of Physical Chemistry". More than one water-solubilizing polar group Z may be present upon the radical A. In the preferred embodiment of this invention, Z represents a sulfonate or a sulfate group. The methods of the present invention are also applicable to the preparation generally of thioureas wherein one of the amido hydrogens is replaced by a radical having thereon a water-solubilizing polar group and especially a sulfonate or sulfate group; that is, another amido hydrogen need not necessarily be replaced by a high molecular weight acyclic radical. Such compounds, however, form a definitely less preferred embodiment of the invention because they are not surface active to a high degree.

The new compositions covered in this case belong to the class of surface active or capillary active materials in that they have colloidal properties and may, therefore, be advantageously used in any process involving wetting, penetrating, deterging, dispersing, emulsifying, frothing, foaming, and kindred phenomena. These compositions may be employed in pure or standardized form, and, if desired, in conjunction with known processing or treating agents. They may be used by themselves or in combination with other surface active agents in any relation in which surface active agents having colloidal properties have heretofore been used.

Many uses of these new compositions are connected with treatments for processing and improving natural and synthetic textile materials. A few representative uses of these new products as textile assistants will be mentioned in order that the importance and widespread applicability of these new products in the textile industries may be fully appreciated. They may be used alone or in combination with other suitable detergents for cleansing and scouring vegetable and animal fibers when removing fatty or oil materials. When added to flax retting baths, they function as wetting and penetrating agents. They may be employed as assistants in fulling and felting processes. They may be used in sizing preparations in combination with the usual materials such as starches or gelatine or their equivalents, clays, talcs or their equivalents, weighting salts such as magnesium sulfate or calcium chloride, oils and oils processed by oxidation, polymerization, sulfonation, etc. The penetrating power of these new compositions is utilized with advantage when they are added to baths containing starch ferments which are employed for removing sizing from textile materials. These products function as useful wetting, cleansing, and penetrating agents in bleaching liquors such as those used in the kier boiling of cotton goods. They may be added to the lye liquors used for mercerizing cotton goods. They improve the absorption capability of fibrous materials when such materials are subjected to treatments for finishing, softening, stiffening, coloring, impregnating, water-proofing, and mildew-proofing. They may be used alone or in combination with other materials for lustering or delustering fabrics. They may be employed to oil or lubricate textile materials and as assistants in processes of weighting or loading fabrics. They may be used as assistants in silk degumming liquors and silk soaking solutions. They can also be used to assist in twist setting in yarn and in processes of stripping colors.

Another important class of uses of these new compositions is as assistants in the preparation and application of dyestuffs. They may be used in the preparation of dyestuffs in readily dispersible form and for the production of inorganic pigments or pigments of azo, basic, acid, vat, and sulfur dyes in a finely divided condition. As penetrants and wetting agents they assist in producing level dyeings in neutral, slightly acid, or alkaline dyeing baths. They facilitate dyeing with developed dyes, the dyeing of animal fibers with vat dyes, the dyeing of cellulose acetate fibers with insoluble dyes, dyeing and printing with aniline black, and the dyeing of leather. In printing pastes they assist in the dispersion of the dye or dye component and facilitate its penetration into the natural or synthetic fiber. Solutions of these compounds are useful for increasing the fastness of dyeings on textile materials. Solutions of these compounds may be used for increasing the affinity of textile fibers of vegetable origin for acid-chrome dyestuffs. These compounds may be used as assistants in resist printing processes.

In the leather industry these compositions function as useful wetting agents in soaking, deliming, bating, tanning, and dyeing baths. They are useful in softening and treating baths for hides and skins, particularly in baths used for fat-liquoring leather, and in processes of waterproofing leather. Solutions of these compounds are useful for pretreating leather prior to dyeing.

The dispersing and emulsifying powers of these new compositions give rise to many interesting uses. They may be utilized for converting liquid or solid substances normally insoluble in water, such as hydrocarbons, higher alcohols, pitches, and pitchy substances into clear solutions or stable emulsions or dispersions. They are useful in preparing emulsions of wax and wax-like compositions which are used as leather dressings or floor polishes. They may be used to prepare artificial dispersions of crude, vulcanized, or reclaimed rubber. They may be used as emulsifiers in the manufacture of cosmetic preparations such as cold creams and lip sticks. They may be employed for preparing emulsions of the water-in-oil type such as emulsions of water in such organic solvents as are used in the dry cleaning industry.

These compositions may also be used alone as contact insecticides and for enhancing the spreading and penetrating power of other parasiticides. They may be employed in agricultural sprays in combination with the ordinary insecticides and fungicides. They are useful for promoting the penetrating power of wood preservatives.

In the paper industry these products may be used as penetrants in the liquors used for cooking rags and pulp, and as assistants in paper softening, filling, and processes to increase absorbency.

These compositions may be employed as detergents in several different relations. They may be used in the washing of fruits and vegetables for spray residue removal. They may be used in combination with metal cleaning compounds in neutral, slightly acid, or alkaline liquors. They may be used for paint, varnish, and lacquer cleaners. They may advantageously be employed as cleasing agents in hard water and where a fatty or oil film resists the ordinary cleansing media. They may be added to soap in hard water baths since these compositions do not form precipitates so readily in hard waters as soaps and Turkey red oils.

These compositions may be used as aids in various chemical reactions. They may be used to control particle size and shape during precipitation or crystallization of compounds from reaction mixtures. They may be used to decrease the particle size of insoluble amine hydrochlorides just before these amines are to be diazotized.

These compositions also have several miscellaneous uses. They may be employed as foam stabilizing agents, especially for use in air-foam fire extinguishing compositions. They may be used to stabilize rubber latex. They may also be used as frothing and collecting agents in ore flotation processes, and in other processes such as the recovery of fixed oil from the oil sands. The uses mentioned will suggest many similar ones.

These compounds may be used in tooth paste, nonspattering margarins, and may be employed as emulsifying agents for synthetic rubber latex such as that made from chloroprene.

The above description and examples are intended to be illustrative only and not to limit the scope of the invention. Any departure therefrom which conforms to the spirit of the invention is intended to be included within the scope of the appended claims.

I claim:

1. A thiourea wherein one of the amido hydrogen atoms on one nitrogen atom is replaced by an acyclic radical which contains at least eight carbon atoms, and another of the amido hydrogen atoms on the other nitrogen atom is replaced by a radical which contains a water-solubilizing polar group.

2. A compound according to claim 1 wherein the water-solubilizing polar group is one selected from the category consisting of sulfate and sulfonate groups.

3. A surface active thiourea having the general formula:

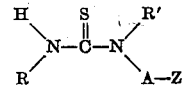

in which one R is an acyclic hydrocarbon radical having at least 8 carbon atoms, the other R is an organic residue having a water-solubilizing polar group, and R' is a member selected from the class consisting of hydrocarbon radicals and hydrogen.

4. A surface active thiourea having the general formula:

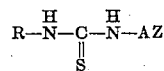

in which R is an acyclic hydrocarbon radical having at least 8 carbon atoms, R' represents a member selected from the class consisting of hydrocarbon radicals and hydrogen, A is a hydrocarbon radical, and Z represents a water-solubilizing polar group selected from the category consisting of sulfate and sulfonate groups.

5. A surface active thiourea having the general formula:

$$R-N(H)-C(=S)-N(H)-AZ$$

wherein R stands for a straight chain aliphatic hydrocarbon radical having from 8 to 18 carbon atoms inclusive, A stands for a hydrocarbon radical, and Z represents a water-solubilizing polar group selected from the category consisting of sulfate and sulfonate groups.

6. Process for preparing thioureas which comprises reacting an acyclic isothiocyanate, R—NCS, wherein R has at least 8 carbon atoms with an amine having at least one amino hydrogen atom and in which another amino hydrogen atom is replaced by a radical containing a water-solubilizing polar group.

7. Process according to claim 6 in which the amine has the formula:

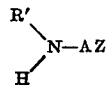

wherein R' is selected from the class consisting of hydrocarbon radicals and hydrogen, A is a hydrocarbon radical, and Z is a water-solubilizing polar group chosen from the class consisting of sulfate and sulfonate groups.

8. A surface active thiourea which has the following general formula in the form of a free acid:

$$R-N(H)-C(=S)-N(H)-CH_2-CH_2SO_2OH$$

wherein R stands for a straight chain aliphatic hydrocarbon radical having from 8 to 18 carbon atoms inclusive.

9. N-(9,10-octadecenyl)-N'-(beta-sulfoethyl) thiourea.

10. A surface active thiourea having the general formula:

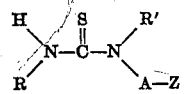

in which R is an acyclic hydrocarbon radical having at least 8 carbon atoms, R' represents a member selected from the class consisting of hydrocarbon radicals and hydrogen, A is an aliphatic hydrocarbon radical, and Z represents a sulfate group.

11. A surface active thiourea having the general formula:

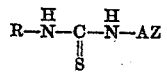

wherein R stands for a straight chain aliphatic hydrocarbon radical having from 8 to 18 carbon atoms inclusive, A stands for an aliphatic hydrocarbon radical, and Z represents a sulfate group.

12. N-dodecyl-N'-sulfatopropyl thiourea.

13. An N-alkyl-N'-methyl-N'-sorbityl thiourea wherein the alkyl group contains from 8 to 18 carbon atoms.

14. N-dodecyl-N'-methyl-N'-sorbityl thiourea.

PAUL LAWRENCE SALZBERG.